United States Patent [19]

Velasco

[11] Patent Number: 4,700,789
[45] Date of Patent: Oct. 20, 1987

[54] DEVICE TO OBTAIN RING-SHAPED CAVITIES IN THE BOTTOM OF DRILLED HOLES MADE IN ANY TYPE OF MEDIUM

[76] Inventor: Vicente S. Velasco, Canillas 93-4°-A, Madrid, Spain

[21] Appl. No.: 845,073

[22] Filed: Mar. 19, 1986

[30] Foreign Application Priority Data

Dec. 31, 1985 [ES] Spain ............................ 550611

[51] Int. Cl.⁴ .................. E21B 10/32; E21B 10/66
[52] U.S. Cl. ........................ 175/202; 175/273; 175/345; 175/406; 148/151
[58] Field of Search ............. 175/202, 263, 273, 292, 175/344, 345, 346, 347, 406; 408/150, 151

[56] References Cited

U.S. PATENT DOCUMENTS

| | | | |
|---|---|---|---|
| 1,427,609 | 8/1922 | McDonald | 175/292 |
| 2,538,890 | 1/1951 | Woodcock | 408/151 |
| 3,233,480 | 2/1966 | Briney, Jr. et al. | 408/151 |
| 3,753,470 | 8/1973 | Lagerstrom et al. | 175/292 |
| 3,961,857 | 6/1976 | Koblesky | 408/150 |
| 4,440,244 | 4/1984 | Wiredal | 175/292 |

*Primary Examiner*—Stephen J. Novosad
*Assistant Examiner*—Terry Lee Melius
*Attorney, Agent, or Firm*—Michael J. Striker

[57] ABSTRACT

An apparatus for creating annular cavities in the bottom of drilled holes in any medium having a body, an axle within the body at one end and rotated by a conventional drill, a reamer secured to the axle at its other end, an inner part enveloping the axle and an outer part enveloping the inner part, both parts being eccentric and rotatable with respect to each other. Their respective eccentricities are such that when opposing each other in opposite directions, the axle is parallel to the outer part. Joint rotation of the parts causes the reamer to move in a planetary manner. The outer part may be held stationary or dragged along by the inner part for joint rotation. Channels are provided within the parts to the reamer to supply cooling water to the reamer and to remove waste material generated by the reamer.

11 Claims, 6 Drawing Figures

E-F

A-B

C-D

DEVICE TO OBTAIN RING-SHAPED CAVITIES IN THE BOTTOM OF DRILLED HOLES MADE IN ANY TYPE OF MEDIUM

FIELD OF THE INVENTION

The present invention relates to an apparatus specially designed for obtaining annular cavities or radial enlargements in the bottom of drilled holes in any type of surface. Such surface is preferably a concrete wall, but may be made of stone, brick, steel, etc.

BACKGROUND OF THE INVENTION

The present applicant owns Spanish Pat. No. 548,461, which consists of a series of improvements for anchoring systems through threaded bolts. Such anchoring systems require an annular cavity at the bottom of a hole in a wall or surface. The proposed apparatus of the present invention is specifically designed for obtaining such an annular cavity at the bottom of holes, which allow the application of such systems to anchor through threaded bolts.

SUMMARY OF THE INVENTION

The present invention performs its work in cooperation with a reamer, which is made from material suitable for the type of material of the hole wall. The reamer is driven by a conventional drilling machine, which has an outlet head coupled to an axle. The reamer is unified with the axle, becoming solidarized.

In particular, the axle is housed within a longitudinal eccentric orifice of a first enveloping part, which in turn has play within the cavity of another longitudinal eccentric orifice of a second enveloping part. The outer enveloping part has a diameter corresponding to that of a previously made hole in the surface and has a length conforming to the depth of the hole, being that the diameter of the reamer is also coincident to the diameter of the hole.

At a certain position which is relative to both enveloping parts, their eccentricities counteract and the axle of the drill remains in an axial position relative to the outer enveloping part. This position permits the axle to freely penetrate into the drilled hole or cavity. The reamer can start to move radially by rotating the inner enveloping part from this same position, so that the reamer emerges radially with respect to the outer enveloping part. Consequently, the reamer starts to work on the side wall along the depth of the drill. At the same time, rotating the outer enveloping part will cause the position of the whole assembly to progressively change, such that the reamer, or more specifically the working area of it, will be able to describe a circumferential route coincident with the annular cavity to be attained.

As another characteristic of the invention and complementing the described structure, the apparatus provides refrigerant for the reamer during operation. The outer enveloping part, or more specifically its adaptation area against the surface, is defined by an annular chamber, deformable elastically, which adapts itself to the surface.

An inlet water channel is established in the orifice of the outer enveloping part parallel to the axle and ending at the tip of the reamer. Water, or any other refrigerant liquid, will flow to the tip of the reamer to carry away waste material produced from the normal working of the reamer. The liquid is returned to the outside by flowing through an interstice defined between the drill wall itself and the external surface of the outer enveloping part until it reaches the annular chamber, which is connected to a duct or pipe for discharging the liquid.

DESCRIPTION OF THE DRAWINGS

In order to both complement the description below and to aid in a better understanding of the features and characteristics of the invention, a set of drawings were provided accompanying the present Specification and form an integral part of the same. This accompanying set of drawings, which is merely illustrative and not a limiting example, shows the following.

DETAILED DESCRIPTION

Figure 2:
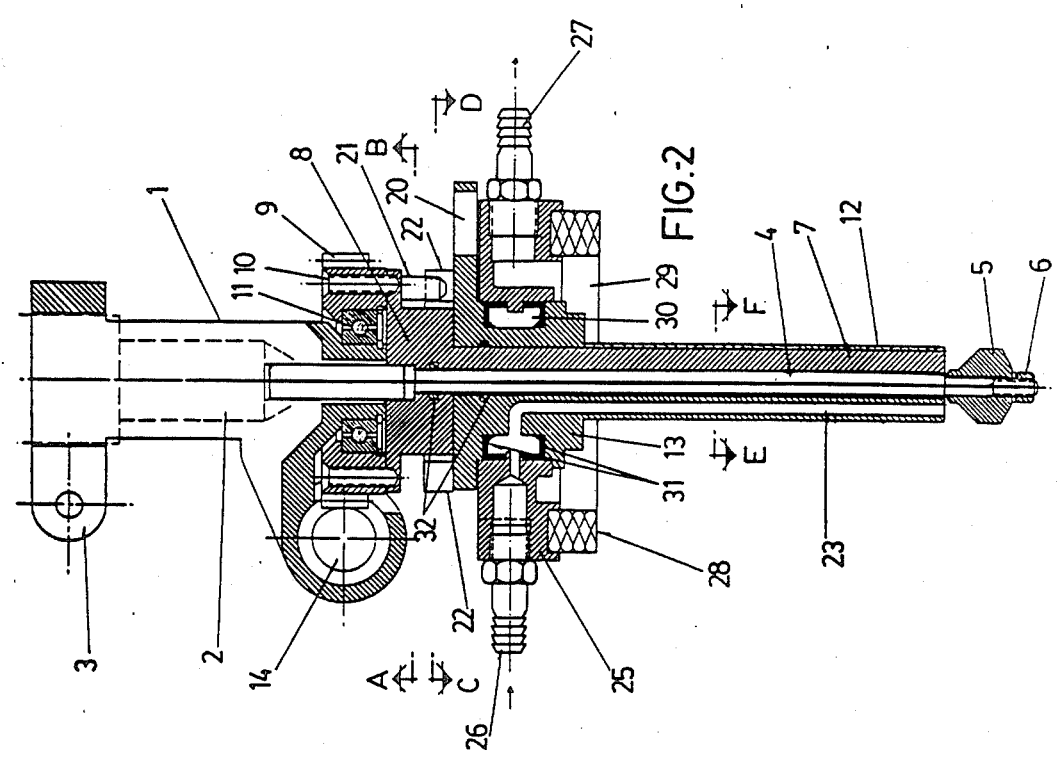
FIG. 2 shows diametrical sectional view of the same assembly as the previous figure.
Figure 1:
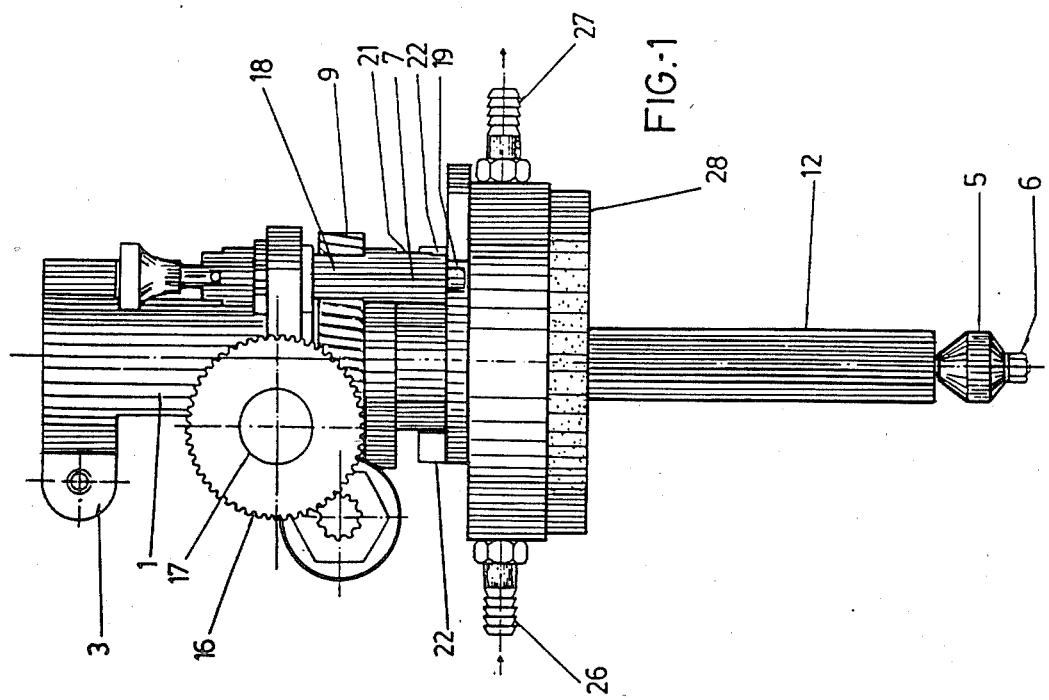
FIG. 1 shows a side elevational view of an apparatus for obtaining annular cavities at the bottom of drill holes for surfaces of any type, made in accordance with a purpose of the present invention.

In view of these figures, it may be seen how the apparatus is made. A body 1 is coupled to the housing of a drilling machine 2 (shown schematically), fastened together by a clamp 3 or by any other conventional means. An axle 4 is fastened coaxially to the rotating head of the drilling machine 2, the axle 4 having a length in accordance with a drill depth. The axle 4 is riveted in a reamer 5, together with which a cavity is to be made, The reamer 5 is held to the axle 4 by a nut 6, which is fastened to an extreme threaded part of the axle 4, so that the reamer 5 and axle 4 come together.

The axle 4, which passes through the body 1 axially, is housed in the cavity of an inner enveloping part 7, which extends as far as to the environs of the reamer 5. The initial part 8 of the inner enveloping part 7 has a considerably expanded area in the radial direction, through which an indented wheel 9 is received preferably in cooperation with screws 10.

The indented wheel 9 may be a formed as a single piece with part 8 of part 7, thereby becoming a whole part 7-8-9 and capable of rotation with respect to body 1 by means of bearings 11. At the same time, axle 4 is capable of rotation in the cavity of the inner enveloping part 7. The characteristic opening for this purpose has a diameter appropriate for that of the axle 4 and is disposed sharply eccentric on the part 7.

In turn, the inner enveloping part 7 is housed within a cavity of a second or outer enveloping part 12, the latter being provided with an orifice which is longitudinal, eccentric, and cylindrical and has a diameter coincident with that of part 7, whose play is adjustable in the cavity of the outer part 12.

Also, this outer enveloping part 12 is provided with an expanded head 13, which rests on the annular step defined between the inner enveloping part 7 and its extreme expanded part 8, as shown in detail in FIG. 2.

The length of the axle 4 and that of the enveloping parts 7 and 12 between the front part defined by the expansion 13 of the outer part 12 and the reamer 5 is of a magnitude in accordance with the depth of the drilled hole in which the annular cavity is to be made.

Based on the foregoing, it can be seen that the rotating movement of the reamer 5 is undertaken for it to work at the expense of the drilling machine being coupled to the apparatus. The possibility for rotation of the two enveloping parts 7 and 12, and the eccentric mounting of these parts and the fitted axle 4, requires that before the reamer 5 is rotated itself, the reamer 5 is to be radially moved to a certain position, in which the reamer 5 is coaxial with the outer enveloping part 12 to facilitate its implantation in the drilled hole. The reamer 5 moves in a planetary manner, which, together with its rotation, gives rise to the desired annular cavity at the bottom of the drilled hole.

Complementing the structure described, the drives of the apparatus are located at the heads 8 and 13 of the enveloping parts 7 and 12 to control and vary the eccentricity of the reamer in the drilled hole.

The bearings 11 and the indented wheel 9 by its head participate to provide mobility for part 7 enveloping the axle 4. The wheel 9 meshes with the endless screw 41 installed on the body 1. The screw 14 has its axial enlargement riveting at a pinion 15, which meshes with another indented crown gear 16 rigidly united to a rotating handle 17.

The mode adopted to provide this movement, namely the crown-spindle drive, was selected as preferable because it keeps the position of the part 7 enveloping the axle 4 blocked when the handle 17 is freed. Obviously, this assembly may be substituted for any other one with a conventional drive. Similarly, the handle 17 may be replaced by any handle, flywheel or any other means of conventional actuation, without affecting the essence of the invention.

A ratchet 18 has been provided, also as a part of the actuation means of the apparatus. The ratchet 18 is mounted on the body 1, of which a shaft 19 penetrates through a radial slot 20 existing at the head of the outer enveloping part 12, as noted in FIG. 4.

Further, at the head of the inner enveloping part 7, there is a spigot 21, with which cooperates a shoulder 22, which is at the head of the outer enveloping part 12. More specifically, the shoulder 22 is located on the head of part 12 so that the spigot 21 of part 7 laterally touches one of the extremes of the shoulder 22 when the eccentricities of the passing drills of both enveloping parts 7 and 12 are oriented in the opposite direction and touches the other end of the shoulder 22 when the parts are oriented in the same direction.

Figure 4:
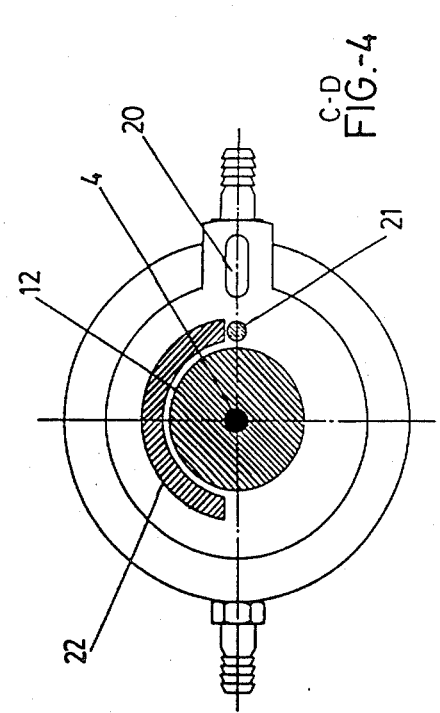
FIG. 4 shows another transverse sectional view of the apparatus, but taken across C–D section lines of FIG. 2. This view depicts the limiting means for rotating the second or outer enveloping part.

Therefore, as shown in detail in FIG. 4, the shoulder 22 extends along an arc of 180° to allow the 180° rotation of the spigot 21 with part 7, in operation with the thickness of the latter. Thus, the extreme areas of the shoulder 22 are the only areas which effect operation. This one spigot 21 may be substituted by two simple spigots, located to corespond with the edges of the shoulder 22, or by any other equivalent stop system.

Based on the described structure, it is understood that during the operation of the apparatus, one may actuate the outer enveloping part in two different ways: either immobilize it, fastening it to the body 1 through the ratchet 18, or allow it to rotate, being dragged along by the inner enveloping part 7 when the spigot 21 in this part pushes on the shoulder 22 on the outer enveloping part 12.

The apparatus operates as follows:

The body 1 of the apparatus is coupled to a drilling machine 2 or to any other motor element. The enveloping part 12 is situated so that its slot 20 is opposite the ratchet 18. You actuate on this ratchet to get its shaft 19 into the slot 20, with which the outer enveloping part 12 becomes secured to the body. After this, the inner enveloping part 7 is rotated with respect to the outer enveloping part 12 until the eccentricities of their respective drills are oriented in the opposite direction. At that time, the reamer 5 and its corresponding axle 4 are situated in a practical axial orientation of the assembly to permit the apparatus to be introduced into the drilled hole previously made in the concrete until the head 13 on the outer enveloping part 12 is stopped by the surface of the wall.

After this, the handle 17 is rotated, which causes the inner enveloped part 7 to rotate by means of the corresponding desribed drive and the outer enveloped part 12 remains still. The eccentricities of their respective longitudinal perforations progressively change in their relative orientation. Consequently, the reamer 5 is laterally moved with respect to the part 1, cutting into the side surface of the drilled hole and undertaking the tearing of the material to attain the desired annular cavity.

When the part 7 has rotated 180° with respect to the outer part 12, the spigot 21 comes into contact with the shoulder 22, at which time the shaft 19 of the ratchet 18 in the slot 20 is extracted. Both enveloping parts 1 and 12 then rotate jointly, the inner enveloping part dragging the outer one, as the spigot 21 pushes on the shoulder 22.

The handle 17 is actuated continuously until the axle 4, located in its most eccentric position, completes a rotation of 360° and, consequently, the eccentricity has done its work in conforming to the annular cavity. In this position, the shaft of the ratchet 18 is again opposite the slot 20 of the outer enveloping part 12.

If it is desired that the cavity be effected in only a part of the perimeter of the drilled hole, the enveloping parts 7 and 12 may be rotated to the angle set forth for the cavity instead of the maximum angle of 360° previously cited. When the desired angle is completed, the handle 17 is rotated in the opposite direction, until the shaft 19 of the ratchet 18 remains opposite the slot 20.

After forming the partial or total annular cavity as the case may be, the ratchet 18 is again actuated to block the outer enveloping part 12 by introducing its shaft 19 into the slot 20. Thereafter, the handle 17 is rotated in a direction opposite to that previously applied, until the spigot 21 stops over the opposite end of the shoulder 22, at which position the eccentricities of the longitudinal perforations of the enveloping parts 7 and 12 are oriented in the opposite direction. This is the equivalent to the position in which the reamer 5 is again disposed coaxially to the apparatus as a whole, to permit extraction from the drilled hole in question.

In conclusion, by introducing the apparatus in a drilled hole or perforation in which the outer enveloping part 12 remains perfectly fitted and actuating the apparatus in the mode mentioned, the reamer 5 is moved initially in the lateral or radial direction with respect to the enveloping part 12. It penetrates an area of the drilled hole wall, beginning the desired cavity. The subsequent joint rotation of the enveloping parts determines the cited planetary movement of the reamer 5, the movement being parallel to the characteristic rotating movement of the reamer 5. This gives rise for the reamer 5 to move about the periphery of the drilled hole to form an annular cavity, whether complete or incomplete, depending upon whether the two enveloping parts rotate at an angle below or equal to 360°.

In accordance with the described structure and operation, the apparatus is perfect from a theoretical point of view. In practice, it is necessary for the reamer to be cooled during the cutting into the dirlled hole, especially when the surface contains hard materials, such as the preferable case of concrete.

Figure 6:
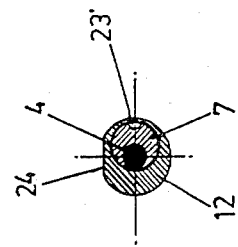
FIG. 6 shows the same view as FIG. 5 but of a different embodiment, in which the conduction cooling is established between both enveloping parts and not from an orifice in the outer enveloping part.
Figure 5:
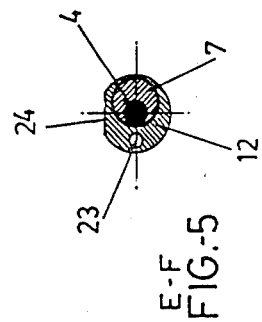
FIG. 5 shows a sectional view of the apparatus taken across E–F section lines of FIG. 2, at a level of insertion in the hollowed space of the orifice.
Figure 3:
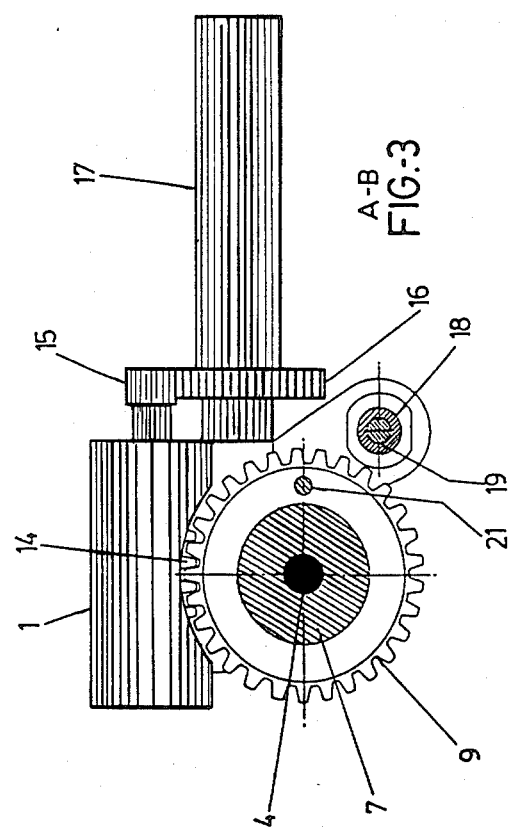
FIG. 3 shows a sectional view of the same apparatus across the A–B section line of FIG. 2. This view details the drive mechanism for rotating the inner enveloping part.

For this purpose, the outer enveloping part 12 incorporates a duct 23, clearly visible in FIGS. 2 and 5. Cooling water in introduced into the working area of the reamer through this duct 23 and is used to carry away waste being produced. Optionally, in accordance with FIG. 6, the duct 23 may be formed as a channel 23' made over one of the generatrices in one of the two enveloping parts 7 and 12, specifically over an outer generatrix of the part 7 or over a generatrix of the inner orifice of part 12. The channel is sealed to form the desired duct with the other part, as shown in detail in the previously cited FIG. 6.

Additionally, there is an offset 24 along a generatrix of the outer surface of the outer enveloping part 12. An outlet for channelling the cooling water containing waste material is formed between this offset 24 and the surface of the drilled hole in the concrete. This offset 24 is located opposite the arc defined by the axle 4 when the inner enveloping part 7 is rotated and the outer enveloping part 12 is stationary. In this way, offset 24 always remains opposite the area of the part 12 that applies pressure against the surface of the drilled hole in the concrete, which is a reaction of the resistance exerted by the concrete to the penetration of the reamer 5.

Furthermore, a basically cylindrical part 25 has been provided for connection of the cooling system, connecting the inlet 26 and the outlet 27 pipes for the cooling water. As shown in FIG. 2, this part 25 is mounted around the head 13 of the outer envelope part 12 so that it may freely rotate with respect to the head 13. Therefore, the part 25 remains stationary when the part 12 rotates.

At its frontal area, the part 25 incorporates a ring 28 of watertight elastic material, which is designed to adjust for adaptation against the surface of the wall when the head 13 of part 25 is stopped by the surface. Also, the part 25 incorporates an annular chamber 29, which is enclosed about the perimeter by the ring 28. This chamber 29 serves as a discharge for the cooling water. The front part of the head 13, which touches the wall, incorporates a radial offset for connection with the longitudinal offset 24 of the chamber 29. The chamber 29 communicates with the outlet piping 27.

The head 13, which communicates with the annular part 25, has a perimetrical slot 30 which, with the annular part 25, forms an annular chamber as well. Watertight retainers 31 seal the chamber 30. Inlet piping 26 enters the chamber 30 and the duct 23 emerges from the chamber 30, the duct 23 being directed towards the working area of the reamer 5.

As also shown in FIG. 2, the chamber 30 for the water inlet and outlet is completely independent of the chamber 29 for waste material.

It can be observed that the cooling water enters the device through inlet 26, passes through the chamber 31 to the duct 23, from which it reaches the work area of the reamer 5. Once the cooling water completes the functions of cooling and carrying away waste material, it returns again to the outside. This time, it travels by way of the channel defined by the offset 24 of the apparatus and the very same wall of the hole, then to the chamber 29, and finally through the outlet 27 to the outside.

It must be noted that in order to avoid leaks by the cooling water through the area in the vicinity of the axle, a couple of retainers 32 are used.

It will be understood that each of the elements described above, or two or more together, may also find a useful application in other types of devices for obtaining ring-shaped cavities differing from the types described above.

While the invention has been illustrated and described as embodied in a device for obtaining ring-shaped cavities in drilled holes in any type of medium, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for the various applications without omitting features that, from the standpoint of prior art, fairly constitute characteristics of the generic or specific aspects of this invention.

What is claimed is new and desired to be protected by Letters Patent is set forth in the appended claims.

I claim:

1. An apparatus for forming an annular cavity in a wall of a hole in a surface of a medium, the apparatus engagable with a means for rotation, the apparatus comprising:

a body;

an axle rotatable within said body and having a first end and an opposite end, said first end being connectable with said rotation means so as to be rotated by the latter;

a reamer united with said opposite end of said axle and being rotatable therewith;

an inner enveloping part extending from said body to said reamer and having a cylindrical shape with a first cavity, said first cavity housing said axle, said axle being eccentrically arranged in said first cavity, said inner enveloping part being rotatable with respect to said body; and an outer enveloping part having an axis and a cylindrical shape with a second cavity, said second cavity housing said inner enveloping part, said inner and outer enveloping parts being eccentrically arranged relative to each other so as to provide relative eccentricities, said inner and outer parts being formed to be rotatable relative to each other into an insertable position in which both said inner and outer enveloping parts are insertable into the hole such that said reamer is aligned coaxially with said axis of said outer enveloping part and also said first and second cavities are counterposed with respect to each other so that said relative eccentricities oppose each other in opposite directions, said reamer being formed so as to project radially outward no further than does said outer enveloping part while said inner and outer enveloping parts are in said insertable position, said inner and outer enveloping parts also being formed to be rotatable relative to each other out of said insertable position to radially project said reamer outward beyond said outer enveloping part and into the wall of the hole, said inner and outer enveloping parts being formed to thereafter be jointly rotatable to cause said reamer to rotate in a planetary manner to thereby form the annular cavity in the hole.

2. The apparatus as defined in claim 1, further comprising:
  means for rotating said inner enveloping part including an endless screw mounted in said body and an indented wheel incorporated in said first head and engaging said endless screw.

3. The apparatus as defined in claim 1, wherein said second head has a radial slot and further comprising:
  means for securing said outer enveloping part to said body, including a ratchet mounted in said body and an anchoring shaft within and movable by said ratchet in and out of said radial slot which secures said outer enveloping part to said body when said anchoring shaft is in said radial slot.

4. The apparatus as defined in claim 1, further comprising:
  means for dragging said outer enveloping part by said inner enveloping part and including a spigot mounted on said first head, a shoulder having two ends and being mounted on said outer enveloping part, said spigot being formed so as to be engagable with said two ends so that said spigot pushes against said shoulder to drag said outer enveloping part when said inner enveloping part rotates along a predetermined angular distance.

5. The apparatus as defined in claim 4, wherein said spigot engages one end of said shoulder when said inner and outer enveloping parts are arranged relative to each other so that said relative eccentricities oppose each other in opposite directions, said spigot engaging the other end of said shoulder when said inner and outer enveloping parts are arranged relative to each other so that said relative eccentricities are oriented in the same direction.

6. The apparatus as defined in claim 4, wherein said shoulder has a semi-circular shape defining a angle of 180° between said two ends.

7. The apparatus as defined in claim 1, wherein said inner and outer enveloping parts each have a free end adjacent to said reamer, said free ends defining one plane when said apparatus is inserted into said drilled hole.

8. The apparatus as defined in claim 1, wherein said second head has a front area closest to said reamer, said frontal area and said reamer defining a distance therebetween corresponding to a depth to said drilled hole.

9. An apparatus for forming an annular cavity in a hole in a surface of a medium, the apparatus engaging a means for rotation and comprising:
  a body;
  an axle rotatable within said body and having a first end and an opposite end, said first end being connectable with said rotation means so as to be rotated by the latter;
  a reamer united with said axle at said opposite end and rotatable therewith;
  an inner enveloping part extending from said body to said reamer and having a cylindrical shape with a first cavity, said first cavity housing and being eccentric to said axle, said inner enveloping part having a first head, said first head being arranged closer to said body than is the rest of said inner enveloping part, said first head and therefore said inner enveloping part being rotatable with respect to said body;
  an outer enveloping part extending from said first head to said reamer and having a cylindrical shape with a second cavity, said second cavity housing said inner enveloping part, said outer enveloping part having a second head, said second head being arranged closer to said first head than is the rest of said outer enveloping part and being arranged eccentric to said inner enveloping part so as to provide relative eccentricities, said outer enveloping part being jointly rotatable with said inner enveloping part, said apparatus being insertable into said hole from said reamer to said second head, said reamer becoming coaxial with said outer enveloping part during said joint rotation of said inner and outer enveloping parts when said first and second cavities are counterposed such that said relative eccentricities are opposing each other in opposite directions, said reamer being movable radially in response to said rotation of said inner enveloping part so as to project radially with respect to said outer enveloping part and into said hole, said joint rotation causing said reamer to rotate in a planetary manner so that said reamer forms said annular cavity in said hole, said second head having a frontal area closer to said reamer than in the rest of said second head;
  an annular part extending radially from said second head and having an outer surface and defining a first chamber therebetween and having an inlet opening and an outlet opening at said outer surface and defining an inlet passage from said inlet opening to said first chamber, said inner and outer enveloping parts forming a duct, said duct extending from said first chamber to said reamer and having an elbow such that said duct extends laterally in said second head between said elbow and said first chamber;
  water tight retainers in said annular part which seal said first chamber; and
  an elastic ring having an inner perimeter and extending from said frontal area of said second head, said elastic ring defining a second chamber within said inner perimeter when said apparatus is sealed to said surface of said medium by said elastic ring, said angular part also defining an outlet passage from said outlet opening to said second chamber, said hole being defined by a wall, said outer part having a second outer surface closer to said wall than is the rest of said outer part, said second outer surface having an offset such that a channel forms between said second outer surface and said wall, said axle describing an arc-shaped path when said first part is rotated and said second part is stationary, said offset being located opposite said arc-shaped path such that when said reamer is in operation producing waste material of said medium from said hole, cooling water may enter through said inlet opening, pass through said first chamber and said duct to said reamer, and return carrying said waste material through said channel and said second chamber and through said outlet opening.

10. The apparatus as defined in claim 9, wherein said duct is formed within said outer enveloping part only.

11. The apparatus as defined in claim 9, wherein said inner enveloping part has a generatrix, said duct being formed at said generatrix.

* * * * *